United States Patent
Cobett et al.

(10) Patent No.: US 11,123,789 B2
(45) Date of Patent: Sep. 21, 2021

(54) METHOD FOR INORGANIC BINDER CASTINGS

(71) Applicant: Lift Technology, Detroit, MI (US)

(72) Inventors: Thomas A. Cobett, Strongsville, OH (US); John R. Keough, Ann Arbor, MI (US); Jiten Shah, Aurora, IL (US)

(73) Assignee: Lift Technology, Detroit, MI (US)

( * ) Notice: Subject to any disclaimer, the term of this patent is extended or adjusted under 35 U.S.C. 154(b) by 0 days.

(21) Appl. No.: 16/748,893

(22) Filed: Jan. 22, 2020

(65) Prior Publication Data

US 2020/0230694 A1    Jul. 23, 2020

Related U.S. Application Data

(60) Provisional application No. 62/795,294, filed on Jan. 22, 2019.

(51) Int. Cl.

| | |
|---|---|
| *B22C 9/02* | (2006.01) |
| *B22C 1/10* | (2006.01) |
| *B22C 1/18* | (2006.01) |
| *B22C 5/04* | (2006.01) |
| *B33Y 80/00* | (2015.01) |
| *B33Y 40/10* | (2020.01) |
| *B33Y 40/20* | (2020.01) |
| *B33Y 30/00* | (2015.01) |
| *B33Y 70/00* | (2020.01) |

(52) U.S. Cl.
CPC .............. *B22C 1/10* (2013.01); *B22C 1/188* (2013.01); *B22C 5/0409* (2013.01); *B22C 9/02* (2013.01); *B33Y 30/00* (2014.12); *B33Y 40/10* (2020.01); *B33Y 40/20* (2020.01); *B33Y 70/00* (2014.12); *B33Y 80/00* (2014.12)

(58) Field of Classification Search
CPC ......... B22C 1/10; B22C 1/188; B22C 5/0409; B22C 9/00; B22C 9/02; B22C 1/16; B33Y 30/00; B33Y 70/00; B33Y 80/00
See application file for complete search history.

(56) References Cited

U.S. PATENT DOCUMENTS

2010/0326620 A1* 12/2010 Muller .................... B22C 1/186
    164/528
2017/0320128 A1* 11/2017 Deters ..................... B32B 18/00

* cited by examiner

*Primary Examiner* — Kevin P Kerns
*Assistant Examiner* — Steven S Ha
(74) *Attorney, Agent, or Firm* — Mitchell S. Zajac; Butzel Long

(57) ABSTRACT

A method for inorganic binder casting, comprising: selecting a Shape-Forming Material based on pre-determined manufacturing and shape characteristics, selecting a casting shape based on pre-determined design characteristics, and forming the Shape-Forming Material into a mold. The mold is coated with an inorganic binder solution at a pre-defined weight ratio and is dehydrated the Shape-Forming Material. The method further comprises pouring a hot liquid metal into the mold and allowing said hot liquid metal to cool to form a molded part. The Shape-Forming Material may be washed from said molded part with a solvent, the inorganic material and Shape-Forming Material reclaimed, reused, and the Shape-Forming Material reformed to a mold. The method further comprises recreating a liquid inorganic binder solution using the reclaimed inorganic material and recoating the Shape-Forming Material with the reclaimed inorganic binder solution.

29 Claims, No Drawings

METHOD FOR INORGANIC BINDER CASTINGS

This application claims priority to U.S. Provisional Application No. 62/795,294, filed Jan. 22, 2019, and which is hereby incorporated by reference in its entirety.

FIELD OF THE INVENTION

The present invention relates generally to a method for producing inorganic shapes using 3D printing and conventional sand mixers. More particularly, the invention consists of steps for casting an item using an shape formed using an inorganic binder solution, the solution being at least partially comprised of a preferred inorganic material and a preferred solvent, and further steps for coating the Shape-Forming material with the inorganic binder solution, dehydrating the coated material, and then pouring liquid metal into or onto the formed shape, causing the metal to solidify and cool, and then washing the item, reclaiming the inorganic binder and Shape-Forming material, and reusing both in subsequent steps of the invention.

BACKGROUND

Additive manufacturing devices, such as, but not limited to sand printers, may be used to produce various shapes utilizing organic binder systems, and/or inorganic binder systems that are hardened or cured by organic catalysts. When liquid metal is poured into cavities formed by these shapes, for producing metal castings, the organic portions of the binder system will pyrolyze and/or oxidize to create gases. Standard sand mixers may likewise be used to produce various shapes in the same fashion. The gases must be exhausted from the cavities being filled with metal to reduce pressure in the cavity, allowing the liquid metal to fill the cavity, and to reduce any reactions that may occur between the gases, the sand, or other Shape-Forming material, and the liquid metal. The invention can help minimize gaseous reactions and mold pressure caused by said gases by reducing the amount of organic material in the casting process. The invention can further help eliminate gaseous reactions and mold pressure by eliminating organic material from the casting process.

BRIEF DESCRIPTION OF DRAWINGS

No drawing is needed for this invention.

DETAILED DESCRIPTION

This invention generally relates to a method for utilizing additive manufacturing and conventional sand mixing techniques to produce various shapes from other Shape-Forming materials (e.g. sand) in the art of casting (this group referred to herein as "Shape-Forming Material"), for producing shapes with a binder solution comprised of a substantial amount (at least 90% by-weight) inorganic material, further including multiple methods for dehydrating and curing said shapes, and methods for reclaiming and reusing Shape-Forming Materials and inorganic material from the binder solution. As used herein, the term "mold" refers to the various shapes created with additive manufacturing techniques, or with traditional sand mixing techniques, with a binder solution comprised of at least 51% inorganic material by weight of the binder solution.

Further Shape-Forming Materials are contemplated to include all solid inorganic materials used in making casting molds and cores, including but not limited to Zirconia, Carbo-ceramics, or Spherical Fly-Ash Dust, among other things.

Shape-Forming Material may be selected based on one or more manufacturing characteristic preferences as pre-determined by the user of the invention, such as surface finish, and being able to produce castings that result in a thin wall, as thin as 2 mm.

When printing the selected Shape-Forming Material, the user may further select a casting shape based on design characteristics known in the art of casting, such as casting wall length, casting depth, and casting cooling and solidifying characteristics.

The invention includes a mold that is substantially inorganic and substantially free of moisture (at least 90% by weight) at the time of casting. As used herein, the term "Substantially Dry Mold" refers to a mold that is substantially free of moisture at the time of casting.

In a mold that is not 100% inorganic, the mold can include organic additives such as, but not limited to, e.g. cellulose, carbohydrates, esters, carbons, phenolics, saw dust, starch, ester, sugar, graphite, sea coal, or other additives which can premixed into the inorganic material.

This invention further relates to a method for utilizing additive manufacturing and conventional sand mixing techniques to produce molds and cores from Shape-Forming Materials with a binder solution comprising 100% inorganic material, multiple methods for curing said shapes, and methods for reclaiming and reusing Shape-Forming Materials and inorganic material. As used herein, the term "Inorganic Mold" refers to molds created with additive manufacturing techniques, or traditional sand mixing techniques, with a solution of 100% inorganic material.

The invention further establishes a mold or Inorganic Mold completely free of moisture at the time of casting. As used herein, the term "Dry Mold" refers to a Mold that is completely free of moisture at the time of casting, and the term "Dry Inorganic Mold" refers to an Inorganic Mold that is completely free of moisture at the time of casting.

There are several inorganic binder materials that have been used as bases for binder solutions in the foundry industry, where a base for binder solutions is that material that comprises the majority of the binder solution by weight. In some present-day solutions, inorganic materials are not the only material in the solution, and other materials, including organic materials, such as, but not limited to, cellulose carbohydrates, esters, carbons, or phenolics, may also be present in the solution. A variety of inorganic binder materials are contemplated by this invention.

In accordance with the present invention, the method can include a first and a second step for creating a mold and/or Inorganic Mold: printing and dehydration.

The at least first and second steps can include printing sand and 100% inorganic binder solutions layer-by-layer or printing sand that is pre-coated with the inorganic binder solution, from an additive manufacturing device, or with a traditional sand mixing technique, and pre-heating, post-heating, pre-heating a curing agent, dehydrating by chemical reaction, or a combination of all four methods, the sand and inorganic binder prints by chemical, conductive, convective, or radiative means.

The at least first and second steps can alternatively include printing sand and any of the described binder solutions layer-by-layer, or printing pre-coated sand, from an additive manufacturing device, or traditional sand mixing technique, and pre-heating, post-heating, pre-heating a curing agent, dehydrating the mold by chemical reaction, or a combination of all four heating methods, the mold with binder solutions by chemical, conductive, convective, or radiative means.

Said chemical means includes the use of $CO_2$ applied through moving nozzles of the additive manufacturing machine or applied directly to a mold created using a traditional sand mixing technique.

As discussed below, an at least third step can be added after formation of the above-stated molds, such that hot liquid metal may be poured into the mold, allowed to cool forming a casting without creating a substantial amount of organic gases. The at least third step also contemplates the pouring of hot liquid metal into the mold and allowing the metal to cool resulting in a casting without creation of any organic gases.

In another possible step of the present invention, after casting, casting washing the mold with water may be performed. The additional step can be performed with cold water, at least cooler than 60 degrees Fahrenheit. The additional step may also be performed with other solvents known in the art of casting.

In yet another possible step of the present invention, the Shape-Forming Materials coated with a binder solution of the invention may be washed from the casted product, and Shape-Forming Materials and binder materials may be separated, reclaimed, and reused at a rate of near 100%.

This invention contemplates a binder solution of a substantial amount (at least 90% by-weight) of Sodium Silicate ($Na_2O$ $SiO_2$) binder material dissolved in water to serve as the Mold binder material. When a binder solution comprising at least a substantial amount of Sodium Silicate is used in this invention, a negligible amount of gas, or no gas, is produced in the mold, or Dry Mold, when high temperature liquid metal is introduced therein.

This invention further contemplates a binder solution of a partial amount (at least 51% by-weight) of Sodium Silicate ($Na_2O$ $SiO_2$) binder material dissolved in a solvent to serve as the Inorganic Mold binder solution. As with all inorganic binder material solutions contemplated by this invention, a negligible amount of gas, or no gas, is produced in the mold, or Dry Mold, when high temperature liquid metal is introduced therein.

This invention further contemplates a binder solution of 100% Sodium Silicate ($Na_2O$ $SiO_2$) binder material dissolved in water to serve as the Inorganic Mold binder solution. As with all inorganic binder materials contemplated by this invention, a negligible amount of gas, or no gas, is produced in the Dry Mold or Dry Inorganic Mold when high temperature liquid metal is introduced therein.

Binder solutions used in the invention have an optimum weight ratio.

Binder material with weight ratios between 1.0 and 3.5 may be used. One such preferable weight ratio of Sodium Silicate when used as an inorganic binder solution material, is between 2.2 and 1.8 parts $SiO_2$ to 1.0 parts $Na_2O$. Weight ratios contemplated for this invention are preferred to allow for cold solvent solubility of the binder material after it has been dehydrated or fused to a glass. The preferred ratios of the binder material, specifically Sodium Silicate, have weight ratios such that they are neither insoluble in cold water, nor hygroscopic. The various binder solutions contemplated by this invention are further contemplated to be of a low viscosity. The preferred solvent contemplated by this method is cold water for the low-viscosity solution.

Cold water solubility of the inorganic binder material is a preferred element of this invention.

The invention contemplates at least two sub-processes for applying the invention to commercial applications, or otherwise deploying the invention.

The binder solutions contemplated by this invention can be applied layer-by-layer to the Shape-Forming Material in the additive manufacturing device to form a mold or Inorganic Mold. The mold can be dehydrated by one of two methods.

Pre-heating the Shape-Forming Materials to a temperature (range 100° F. to 500° F.) can be deployed to immediately dehydrate the binder.

Pre-heating the Shape-Forming Materials to a temperature to allow for the latent heat of the Shape-Forming Materials, to cause the eventual dehydration of the binder, can be deployed to dehydrate the Shape-Forming Material coated with the binder solution over time—based on the size of the mold or Inorganic Mold.

Post-heating can be deployed to a mold or Inorganic Mold. One such deployment of post-heating may be by radiative means. Radiative means for post heating includes traveling, focused, form of energy. One such form of energy may come from the group consisting of microwaves, laser beams, infra-red light, an arc lamp or electron beams.

Post-heating may also be accomplished through conductive means or convective means. Once such conductive means for post-heating a mold or Inorganic Mold is a heated plate applied to the surface of the mold or Inorganic Mold. One such convective means for post-heating a mold or Inorganic Mold is baking the mold or Inorganic Mold. Additional conductive and convective post-heating means include those known in the art of casting.

Post-heating may also be accelerated by applying a $CO_2$ gas, inorganic acids or inorganic salts to the mold or Inorganic Mold.

Binder solutions can be applied to Shape-Forming Materials in a batch or continuous Shape-Forming Materials mixer, where the Shape-Forming Material is heated prior to or during mixing to cause the evaporation of the water. As evaporation occurs, the Shape-Forming Material becomes dehydrated further becomes a pre-coated Shape-Forming Material, which can be used in the additive manufacturing device or when traditional sand mixing techniques are used as described by this invention. The additive manufacturing device will print water onto the pre-coated Shape-Forming Materials, resulting in instant re-solubilization (where solubilization is the end-state of the process of re-solubilizing). Damp Shape-Forming Materials may then be pre-heated or post-heated to properly dehydrate prior to pouring casting into the printed mold.

Pre-coating Shape-Forming Materials with the binder solutions contemplated by this invention may be done using microwave mixers. Certain binder materials have unusually high dielectric constant values. Sodium silicate is one such material. These mixers allow for the product to be mixed and heated in one step, in one machine. Multi-step mixing and heating is also contemplated by this invention, where the entire batch of binder material and Shape-Forming Materials are not mixed at one time, rather where smaller batches are mixed, and later combined in preparation for use in the additive manufacturing device.

Shape-Forming Materials of any grain fineness, or of any shape, or mineral type, may be bonded using techniques of this invention. The range of AFS GFN 40 to 120 is the preferred grain fineness. The preferred liquid inorganic binder material has a 2.0:1.0 weight ratio when bonded. A preferred set of inorganic binder materials are alkali metal silicates from the group consisting of Lithium, Sodium, and Potassium Silicates. The preferred inorganic binder material is Sodium Silicate. The mixture may become dehydrated by one of the above sub-processes to form a solid mass with a desired shape. A casting can then be poured within the solidified mold with hot liquid metal.

The invention contemplates complex casting shapes with strategic placement of rigging (venting, risering, and gating) without the use of standard tooling. Final placement of said rigging is printed as a part of the process steps for forming the mold or Inorganic Mold prior to casting in a fashion to optimize casting cooling and solidification.

After casting, the bonded Shape-Forming Materials shape may be easily washed away from the solidified metal casting. The preferred method is to use cold water with minimal agitation. This process eliminates dust which is normally present in mechanical Shape-Forming Materials crushing and abrasion, often referred to as a shakeout. Formation of the solidified mold, and the process for cold water washing with minimal agitation allows for specific, pre-defined, thin dimensions to be formed by castings.

The preferred Shape-Forming Material contemplated by this invention is sand.

Agitation can be used during washing, but with minimal agitation required.

The selected binder material is contemplated to be dissolved in a solvent, preferably water, with the binder material recovered, and reused.

After dissolving, the binder may be separated from the Shape-Forming Materials through various means contemplated by this invention. Specifically, the binder material is condensed by water evaporation and inorganic material solids are collected for reuse. Other means for separating the binder material from the Shape-Forming Material include boiling, vacuum extraction, flash condensation, super heating, and other means for separating known in the art.

After washing, separating the binder material, and recapturing the binder material, the Shape-Forming Material may be dried and prepared for reuse.

Water-based reclaim systems are deployed to recapture Shape-Forming Materials and binder materials. The invention further contemplates the use of specialty aggregates with unique physiological, thermal expansion and refractory properties to achieve additional benefits—cleanliness, high performance and close tolerancing castings.

The invention leaves a thin coating of binder material glass remaining on the surface of the casting after washing. The casted product is oxidation and corrosion resistant for at least a period of time.

Casting surface finish can be selected based on grain size of Shape-Forming Materials.

The invention contemplates the reduction in cost of productions for aggregate Shape-Forming Materials castings.

The invention allows for no dust, or negligible amounts of dust, in the casting process. The invention further allows for thin wall, less than 2 mm, castings. The invention further allows for close tolerancing.

The invention reduces the tooling, tooling costs, damage of castings during shake out and labor associated with production of castings.

The invention eliminates, or at least reduces, the formation of volatile organic compounds, $CO_2$, CO, methane and other bi-products of combustion from organic materials.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

As such, those skilled in the art will appreciate that the conception upon which this disclosure is based may readily be utilized as a basis for the designing of other structures, methods and systems for carrying out the several purposes of the present invention. It is important, therefore, that the description be regarded as including such equivalent constructions insofar as they do not depart from the spirit and scope of the present invention.

What is claimed is:

1. A method for inorganic binder casting, comprising:
   selecting a Shape-Forming Material based on pre-determined manufacturing and shape characteristics;
   selecting a casting shape based on the pre-determined manufacturing and shape characteristics;
   printing the Shape-Forming Material using a 3D printing process to form a first mold;
   creating a first liquid binder solution, the first liquid binder solution including at least 51% inorganic material by weight in a first solvent;
   coating the Shape-Forming Material with the first liquid binder solution;
   substantially dehydrating the coated Shape-Forming Material;
   pouring a liquid metal into the first mold;
   allowing the liquid metal to cool to form a solid molded part;
   removing the Shape-Forming Material from the solid molded part with a second solvent;
   reclaiming the inorganic material for reuse;
   reclaiming the Shape-Forming Material for reuse;
   printing the reclaimed Shape-Forming Material using a 3D printing process to form a second mold;
   creating a second liquid binder solution using the reclaimed inorganic material, the second liquid binder solution including at least 51% inorganic material by weight in a third solvent; and
   coating the reclaimed Shape-Forming Material with the second liquid binder solution.

2. The method of claim 1, further comprising reclaiming substantially all of the Shape-Forming Material and the inorganic material.

3. The method of claim 1, wherein the removing of the Shape-Forming Material from the solid molded part further includes the second solvent, being at a temperature of 60 degrees Fahrenheit or less.

4. The method of claim 1, wherein the second solvent includes water.

5. The method of claim 1, wherein the first liquid binder solution includes at least 90% inorganic material by weight in the first solvent.

6. The method of claim 1, wherein the inorganic material is substantially comprised of an alkali metal silicate from at least one of the group consisting of Lithium, Sodium, Potassium, and Sodium Silicate.

7. The method of claim 1, wherein coating the Shape-Forming Material with the first liquid binder solution is performed by a layer-by-layer additive manufacturing process.

8. The method of claim 1, further comprising heating the Shape-Forming Material prior to printing the Shape-Forming Material using the 3D printing process.

9. The method of claim 8, wherein heating the Shape-Forming Material includes heating to a temperature range between 100 to 500 degrees Fahrenheit.

10. The method of claim 8, further comprising determining a latent heat value required to dehydrate the Shape-Forming Material,
wherein the substantial dehydrating the Shape-Forming Material is accomplished by latent heating based on the determined latent heat value.

11. The method of claim 8, wherein the substantially dehydrating the Shape-Forming Material is prior to printing the Shape-Forming Material using the 3D printing process.

12. The method of claim 11, further comprising hydrating the Shape-Forming Material after printing the Shape-Forming Material using the 3D printing process and
further comprising substantially dehydrating the Shape-Forming Material after hydrating the Shape-Forming Material.

13. The method of claim 1, further comprising heating the Shape-Forming Material after printing to form the first mold.

14. The method of claim 1, further comprising mixing the Shape-Forming Material and the first liquid binder solution prior to printing to form the first mold.

15. The method of claim 1, wherein coating the Shape-Forming Material with the first liquid binder solution is performed in a layer-by-layer process, and
wherein substantially dehydrating the Shape-Forming Material is performed in a layer-by-layer process.

16. The method of claim 1, wherein substantially dehydrating the coated Shape-Forming Material is performed by at least one from the group consisting of a conductive, a convective, a radiative, and a chemical heating process.

17. The method of claim 1, wherein the inorganic material is soluble in cold water.

18. The method of claim 1, further comprising selecting a grain size of the Shape-Forming Material in a range of AFS GFN 40 to 120.

19. The method of claim 1, wherein the Shape-Forming Material includes sand.

20. The method of claim 1, wherein reclaiming the inorganic material is performed by evaporation.

21. The method of claim 1, wherein the Shape-Forming Material includes at least one predetermined property from the group consisting of a physiological property, a thermal expansion property and a refractory property.

22. The method of claim 1, wherein the removing the Shape-Forming Material further includes agitating the Shape-Forming Material.

23. The method of claim 1, wherein the first liquid binder solution comprises Sodium Silicate having a weight ratio of between 3.5 parts $SiO_2$, to 1 part $Na_2O$.

24. The method of claim 23, wherein the first liquid binder solution comprises Sodium Silicate having a weight ratio of between 2.2 and 1.8 parts $SiO_2$, to 1 part $Na_2O$.

25. The method of claim 24, wherein the Sodium Silicate further comprises a weight ratio of 2 parts $SiO_2$, to 1 part $Na_2O$.

26. The method of claim 1, wherein the first solvent includes water.

27. The method of claim 1, wherein the third solvent includes water.

28. A method for inorganic binder casting, comprising:
selecting a Shape-Forming Material based on pre-determined manufacturing and shape characteristics;
selecting a casting shape based on the pre-determined manufacturing and shape characteristics;
printing the Shape-Forming Material using an additive manufacturing process to form a first mold;
creating a first liquid binder solution, the first liquid binder solution including at least 51% inorganic material by weight in a first solvent;
coating the Shape-Forming Material with the first liquid binder solution;
substantially dehydrating the coated Shape-Forming Material;
pouring a liquid metal into the first mold;
allowing the liquid metal to cool to form a solid molded part;
removing the Shape-Forming Material from the solid molded part with a second solvent;
reclaiming the inorganic material for reuse;
reclaiming the Shape-Forming Material for reuse;
printing the reclaimed Shape-Forming Material using an additive manufacturing process to form a second mold;
creating a second liquid binder solution using the reclaimed inorganic material, the second liquid binder solution including at least 51% inorganic material by weight in a third solvent; and
coating the reclaimed Shape-Forming Material with the second liquid binder solution.

29. A method for inorganic binder casting, comprising:
selecting a Shape-Forming Material based on pre-determined manufacturing and shape characteristics;
selecting a casting shape based on the pre-determined manufacturing and shape characteristics;
utilizing the Shape-Forming Material using a sand mixer process to form a first mold;
creating a first liquid binder solution, the first liquid binder solution including at least 51% inorganic material by weight in a first solvent;
coating the Shape-Forming Material with the first liquid binder solution;
substantially dehydrating the coated Shape-Forming Material;
pouring a liquid metal into the first mold;
allowing the liquid metal to cool to form a solid molded part;
removing the Shape-Forming Material from the solid molded part with a second solvent;
reclaiming the inorganic material for reuse;
reclaiming the Shape-Forming Material for reuse;
utilizing the reclaimed Shape-Forming Material using a sand mixer process to form a second mold;
creating a second liquid binder solution using the reclaimed inorganic material, the second liquid binder solution including at least 51% inorganic material by weight in a third solvent; and
coating the reclaimed Shape-Forming Material with the second liquid binder solution.

* * * * *